June 14, 1949.
C. B. SPASE
2,472,925
OVERLOAD OR FIXED LOAD CLUTCH
Filed Sept. 7, 1944
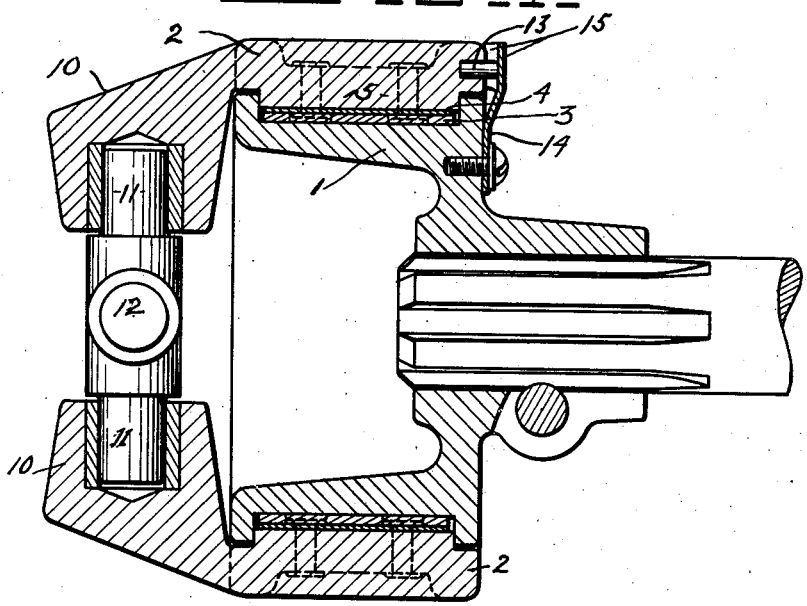
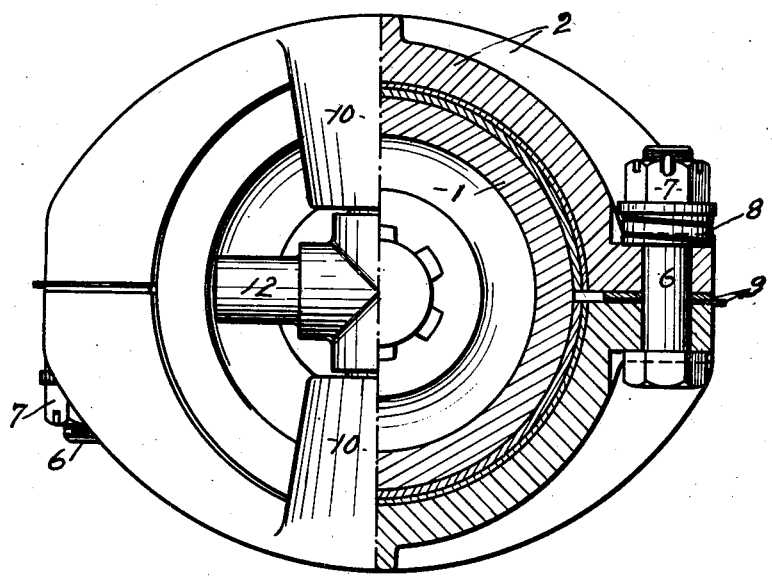
INVENTOR:
Charles B. Spase,
BY
Bodell & Thompson
ATTORNEYS.

Patented June 14, 1949

2,472,925

UNITED STATES PATENT OFFICE 2,472,925

OVERLOAD OR FIXED LOAD CLUTCH

Charles B. Spase, Nedrow, N. Y., assignor to Lipe-Rollway Corporation, Syracuse, N. Y., a corporation of New York Application September 7, 1944, Serial No. 552,962

2 Claims. (Cl. 64—30)

This invention relates to clutches, and has for its object a constantly-engaged overload or fixed load clutch, or a clutch in which the members engage with a predetermined friction and slip when an overload is applied. The clutch is particularly adapted for transmitting motion to mechanisms, as the mechanisms of agricultural machines, etc., where the tool, as for example the knife of a mower or binder, engages an obstruction, as a stone, and the clutch slips or disengages, in order to prevent damage to the tool. It is also particularly designed for power take offs for tractors pulling implements having movable tools which are actuated by power from the tractor or from the motor of the tractor.

The invention further has for its object a clutch construction, which is particularly simple and compact in construction and in which the friction can easily be adjusted to a predetermined amount.

The invention further has for its object such a clutch, which is part of the universal joint, and a clutch so constructed as to prevent undue axial displacement of the clutch members relatively to each other, and also undue tilting movement, so that the center of the universal joint is subject to minimum shifting or play.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a clutch embodying this invention.

Figure 2 is an end elevation partly in section.

This clutch includes, generally, driving and driven members having coacting friction faces concentric with the axis of the clutch, one of said members being composed of arcuate sections and having means for clamping the sections against the friction face of the other member with a predetermined friction.

In the illustrated embodiment of my invention, the friction surfaces are cylindrical and the outer clutch member is formed of arcuate sections or semi-cylindrical halves which may be clamped toward each other by means of spring clamps which include spring means to apply a predetermined amount of friction to the friction faces.

1 designates one of the clutch members, as the driving member, and 2 the driven member, the driving member being a drum formed with a cylindrical friction face 3, and the driven member, which surrounds the drum being provided with a complemental internal cylindrical friction face 4. The members are interlocked against relative axial movement, and as here illustrated, the member 1 is provided with a peripheral channel on the bottom of which the friction face 3 is provided, and the member 2 is provided with raised internal portions 5 fitting into the channel of the drum 1 and provided with the friction face 4. By reason of the interfitting of the portion 4 in the channel of the driving member 1, the two members are held from appreciable relative axial movement.

As seen in Figure 2, the outer member 2 is formed of arcuate sections, and preferably of halves, and these are clamped together by spring clamping means, as bolts 6 located diametrically opposite each other, and extending through lugs on the halves, nuts 7 threading on the bolts, and springs 8 between the nuts and the lugs. The nuts are tightened to apply the required amount of friction. Shims 9 are preferably interposed between the lugs around the bolts 6 to initially set or limit the friction applied by the springs 8. The friction faces are preferably metal, so that the clutch engages with a metal to metal contact, and there is very little wear. One of the sections, as the outer section 2, is provided with diametrically opposite yoke arms 10, which are formed with radial bearings for diametrically opposite trunnions or pins 11 of the spider of a universal joint, the spider having additional trunnions or arms 12 arranged at a right angle to the arms 11 to coact with bearings on the other portion of the universal joint not shown. One yoke arm is provided on each half section of the member 2.

By reason of the wide cylindrical friction faces and the interfitting of the members 1 and 2, against axial displacement, the center of the universal joint remains substantially constant or does not shift, as axial and tilting movements of the member 2 relatively to the member 1 are prevented or held to inconsequential limits. Owing to the sectional arcuate formation of one of the clutch members, as the outer clutch member 2, and to the spring clamping means, the clutch may be readily adjusted to suit the various situations in which it is applied.

For the purpose of notifying the operator when the overload clutch is slipping, a suitable alarm device is provided, this being here shown as a clicker consisting of a pin 13 on one of the clutch members, as one of the arcuate sections of the driven clutch member 2, and a spring arm 14 secured to the other member 1 and having a corrugated segment 15 or a segment formed with a ratchet surface coacting with the pin. When the clutch slips by reason of the mechanism connected to the driven member 2 of the clutch through the universal joint encountering an obstruction or an overload, the pin will ratchet over the corrugations, creating a clicking noise. The part 14 may be a complete circle, but it is essential for the purpose of giving an alarm that it be segmental.

What I claim is:

1. An overload clutch including driving and driven members having coacting friction faces concentric with the axis of the clutch, one of said members being composed of opposed arcuate sections, and spring clamping means for clamping the sections together to create a predetermined amount of friction between the friction faces of the members, said members having means for interfitting to hold the same from relative axial movement, diametrically opposed arcuate sections having yoke arms forming a part of a universal joint.

2. An overload clutch including driving and driven members, one member comprising a drum formed with a peripheral channel, the bottom of which is provided with a friction face, the other member including opposed substantially semi-cylindrical sections embracing the drum and having portions interfitting in the channel, so that the members are held from relative axial movement, and spring clamping means for clamping the sections onto the drum with a predetermined friction and to hold the sections and the drum from relative rocking movement, the sections being provided with yoke arms forming part of a universal joint.

CHARLES B. SPASE.

REFERENCES CITED

The following references are of record in the file of this patent:

UNITED STATES PATENTS

| Number | Name | Date |
|---|---|---|
| 810,516 | Wilson | Jan. 23, 1906 |
| 1,232,540 | Hartmann | July 10, 1917 |
| 1,490,951 | Werner | Apr. 22, 1924 |
| 1,601,438 | Gustafson | Sept. 28, 1926 |
| 1,847,882 | Lorig | Mar. 1, 1932 |
| 2,292,752 | Johnson | Aug. 11, 1942 |
| 2,333,553 | Potgieter et al. | Nov. 2, 1943 |
| 2,390,908 | Young | Dec. 11, 1945 |

FOREIGN PATENTS

| Number | Country | Date |
|---|---|---|
| 2,116 | Great Britain | Mar. 1, 1932 |